United States Patent
Bhattacharya et al.

(10) Patent No.: US 8,751,496 B2
(45) Date of Patent: Jun. 10, 2014

(54) SYSTEMS AND METHODS FOR PHRASE CLUSTERING

(75) Inventors: Indrajit Bhattacharya, Bangalore (IN); Shantanu Ravindra Godbole, New Delhi (IN); Akshit Sharma, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 419 days.

(21) Appl. No.: 12/946,896

(22) Filed: Nov. 16, 2010

(65) Prior Publication Data

US 2012/0124044 A1 May 17, 2012

(51) Int. Cl.
G06F 17/30 (2006.01)

(52) U.S. Cl.
USPC .......................... 707/737; 707/748

(58) Field of Classification Search
USPC .................................. 707/737, 748
See application file for complete search history.

(56) References Cited

U.S. PATENT DOCUMENTS

| | | | |
|---|---|---|---|
| 6,167,397 A | 12/2000 | Jacobson et al. | |
| 6,944,607 B1 | 9/2005 | Zhang et al. | |
| 7,383,258 B2 | 6/2008 | Harik et al. | |
| 7,519,590 B2 | 4/2009 | Chandrasekar et al. | |
| 2002/0042793 A1* | 4/2002 | Choi | 707/6 |
| 2002/0099702 A1 | 7/2002 | Oddo | |
| 2003/0120630 A1 | 6/2003 | Tunkelang | |
| 2007/0112755 A1 | 5/2007 | Thompson et al. | |
| 2008/0016050 A1 | 1/2008 | Stensmo | |
| 2008/0177736 A1* | 7/2008 | Spangler | 707/5 |
| 2009/0094207 A1 | 4/2009 | Marvit et al. | |
| 2009/0313228 A1 | 12/2009 | Grandhi et al. | |
| 2011/0191098 A1* | 8/2011 | Thomas et al. | 704/9 |

OTHER PUBLICATIONS

Lin et al. "New Tools for Web-Scale N-Grams", Google, Inc, May 5, 2010.*
Bian, Haiyun, and Bhatnagar, Raj, "A Level Wise Search Algorithm for Interesting Subspace Clusters", Proceedings of the Fifth IEEE International Conference on Data Mining (ICDM'05), available at http://www.computer.org/portal/web/csdl/doi/10.1109/ICDM.2005.9.
Cao, Yiquin; Jiang, Tao; and Girke, Thomas, "Accelerated Similarity Searching and Clustering of Large Compound Sets by Geometric Embedding and Locality Sensitive Hashing", published online on Feb. 23, 2010, by Bioinformatics, available at http://bioinformatics.oxfordjournals.org/cgi/content/abstract/26/7/953.

* cited by examiner

*Primary Examiner* — Cindy Nguyen
(74) *Attorney, Agent, or Firm* — Ference & Associates LLC

(57) ABSTRACT

Systems and associated methods for enhanced concept understanding in large document collections through phrase clustering are described. Embodiments take as input an initial set of phrases and estimate centroids using a clustering process. Embodiments then generate new phrases around each of the current centroids using the current phrases. These new phrases are added to the current set, and the clustering process is iterated. Upon convergence, embodiments finalize clusters based on phrases of any given length.

10 Claims, 5 Drawing Sheets

SYSTEMS AND METHODS FOR PHRASE CLUSTERING

BACKGROUND

Businesses routinely encounter large collections of documents. For example, companies routinely receive feedback, suggestions, grievances from customers via survey responses, and the like. There is value in understanding the important issues raised in such document collections. For example, a business may wish to quickly ascertain important issues raised in customer feedback comments to improve the business.

Given a large collection of documents, for example a collection of email documents, clustering enables a high level understanding of the significant concepts, issues or topics mentioned in the documents. Most clustering approaches are based on clustering unigrams (a unigram is a single a word) based on the unigrams' context, which is in turn formed by the other unigrams occurring around them in the documents. Clustering based on unigrams, however, has significant limitations like low interpretability.

BRIEF SUMMARY

Systems and associated methods for enhanced concept understanding in large document collections through phrase clustering are described. Embodiments take as input an initial set of phrases and estimate centroids using a clustering process. Embodiments then generate new phrases around each of the current centroids using the current phrases. These new phrases are added to the current set, and the clustering process is iterated. Upon convergence, embodiments finalize clusters based on phrases of a given length.

In summary, one aspect provides a method for phrase based clustering comprising: accessing a collection of items to be clustered; receiving an initial set of phrases as input; clustering the collection of items to be clustered using the initial set of phrases to create centroids; generating a new set of phrases around the centroids; adding the new set of phrases to the initial set of phrases to produce a combined set of phrases; and re-clustering the collection of items to be clustered using the combined set of phrases.

Another aspect provides a computer program product for phrase based clustering comprising: a computer readable storage medium having computer readable program code embodied therewith, the computer readable program code comprising: computer readable program code configured to access a collection of items to be clustered; computer readable program code configured to receive an initial set of phrases as input; computer readable program code configured to cluster the collection of items to be clustered using the initial set of phrases to create centroids; computer readable program code configured to generate a new set of phrases around the centroids; computer readable program code configured to add the new set of phrases to the initial set of phrases to produce a combined set of phrases; and computer readable program code configured to re-cluster the collection of items to be clustered using the combined set of phrases.

A further aspect provides a system for phrase based clustering comprising: one or more processors; and a memory operatively connected to the one or more processors; wherein, responsive to execution of computer readable program code accessible to the one or more processors, the one or more processors are configured to: access a collection of items to be clustered; receive an initial set of phrases as input; cluster the collection of items to be clustered using the initial set of phrases to create centroids; generate a new set of phrases around the centroids; add the new set of phrases to the initial set of phrases to produce a combined set of phrases; and re-cluster the collection of items to be clustered using the combined set of phrases.

A still further aspect provides a method for clustering documents comprising: initially clustering a collection of documents to form one or more clusters having one or more centroids; ascertaining centroid words of resultant clusters up to a threshold, wherein the centroid words are unigrams; expanding the unigrams into one or more of bigrams, tri-grams and higher-order grams; and outputting the one or more of bigrams, tri-grams and higher-order grams as descriptive phrases for the one or more clusters The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
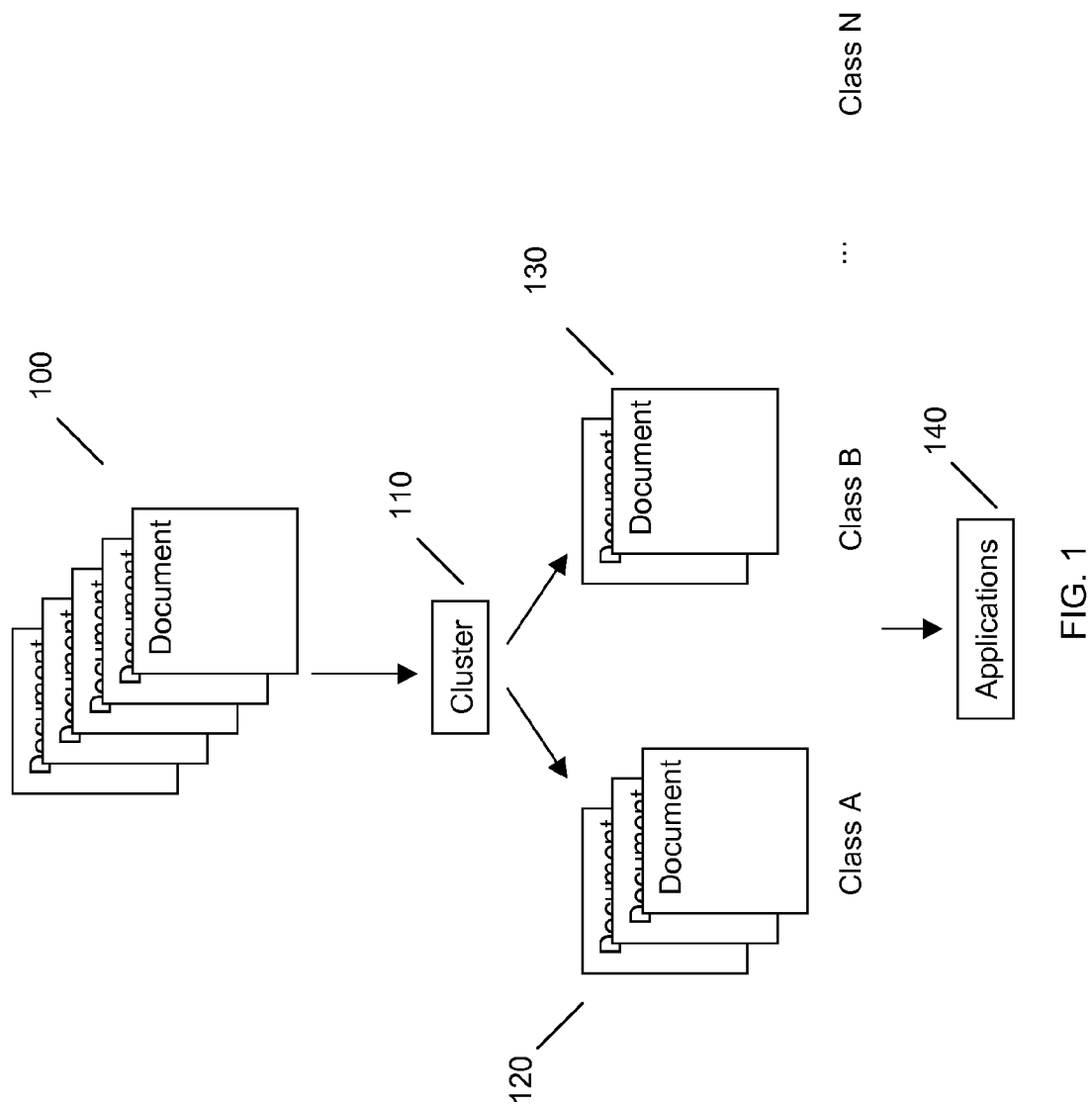
FIG. 1 illustrates a high level view of document clustering and application.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of those embodiments.

Reference throughout this specification to "embodiment (s)" (or the like) means that a particular feature, structure, or characteristic described in connection with the embodiment is included in at least one embodiment. Thus, appearances of the phrases "according to embodiments" or "an embodiment" (or the like) in various places throughout this specification are not necessarily all referring to the same embodiment.

Furthermore, the described features, structures, or characteristics may be combined in any suitable manner in one or more embodiments. In the following description, numerous specific details are provided to give a thorough understanding of example embodiments. One skilled in the relevant art will recognize, however, that aspects can be practiced without one or more of the specific details, or with other methods, components, materials, et cetera. In other instances, well-known structures, materials, or operations are not shown or described in detail to avoid obfuscation.

In this regard, the example embodiments described herein are merely utilized as representative examples. Thus, although "documents" are utilized as an example of objects to be clustered, the methods, approaches, et cetera are equally applicable to other items or objects to be clustered. Moreover, a specific clustering approach (k means) is used as a representative example herein. However, as with various other specific details described herein, other clustering approaches may be utilized depending on the particular use context contemplated.

The description now turns to the figures. The illustrated example embodiments will be best understood by reference to the figures. The following description is intended only by way of example and simply illustrates certain example embodiments representative of the invention, as claimed.

Given a large collection of documents, word clustering enables high level understanding of the significant concepts or topics mentioned in the collection. However, most clustering approaches cluster unigrams (single words) based on their context formed by other unigrams occurring around them in the documents (that is, their context). Unigram clustering is often hard to interpret, as unigrams often do not adequately capture concepts or topics that are relevant. Clusters are significantly easier to interpret/understand when based on longer phrases (k-grams).

This is for example because phrases often convey senses that are not conveyed by sub-phrases or single words. Consider as one example the difference in meaning conveyed by clusters "market" and "share" as compared to a cluster "market share". As another example, consider the difference in meaning conveyed by the clusters "oil", "spill" and "company a" versus the cluster "company a oil spill".

Clearly, the phrase-based cluster offers significant advantages in terms of being more readily understandable. Thus, a clustering approach that places a document into either a "market" or a "share" cluster is not as useful as one in which a document is placed into a "market share" cluster. Likewise, a clustering approach which clusters a document into any of the "oil", "spill" or "company a" clusters is not as useful as one that clusters the document into a "company a oil spill" cluster. For example, such a phrase based clustering approach is far superior for an application in which news documents are clustered into different topics for quick review.

Referring to FIG. 1, an example application includes taking a collection of documents 100 and applying a clustering approach 110 such that the documents 100 are clustered into document classes 120, 130, et cetera. Once separated into document classes 120, 130, a user can more easily browse or search the clustered collection of documents. Thus, applications 140 such as search applications that rely on clustered documents can be utilized more efficiently. For example, a company faced with a collection of documents containing unorganized user feedback would benefit from the ability to organize the collection of documents into meaningful classes (such as type of customer complaint). Other uses are readily apparent, such as more timely ticket resolution, better organization of news stories, more efficient eDiscovery processing, to name but a few.

While phrase based clustering offers advantages in certain contexts it is very processing intensive. Consider for example that a collection of documents can contain many thousands of unigrams. For example, an example collection of documents (discussed further herein) was found to contain in excess of 12,000 unique words. It is readily apparent that given this number of unique words, the document collection may contain a seemingly unmanageable number of phrases that might describe clusters. Thus, unguided phrase based clustering is infeasible because the number of phrases to consider is overwhelmingly large.

Embodiments enable phrase based clustering by intelligently identifying representative phrases for clusters, leaving unhelpful or useless phrases out of the calculation. This allows phrase based clustering processing to complete in a manageable time with good accuracy.

A phrase is defined herein as: each unigram is a phrase; if "$W_1$" and "$W_2$" are phrases, and "$W_1W_2$" appears in a collection of documents, then "$W_1W_2$" is a phrase. The number of phrases can be exponential (based on the number of words). Because of the exponential nature of phrase formulation, a problem arises in finding a manageable number of "representative phrases" for useful clustering. "Representative phrases" of a cluster centroid $C_i$ are those phrases that have similarity at least D to $C_i$. The problem can thus be stated as:

If $C_1, \ldots C_k$ are the centroids of the k clusters obtainable by exhaustive clustering, find the representative phrases for each $C_i$ by enumerating a small fraction of all possible phrases in the document collection.

Figure 2:
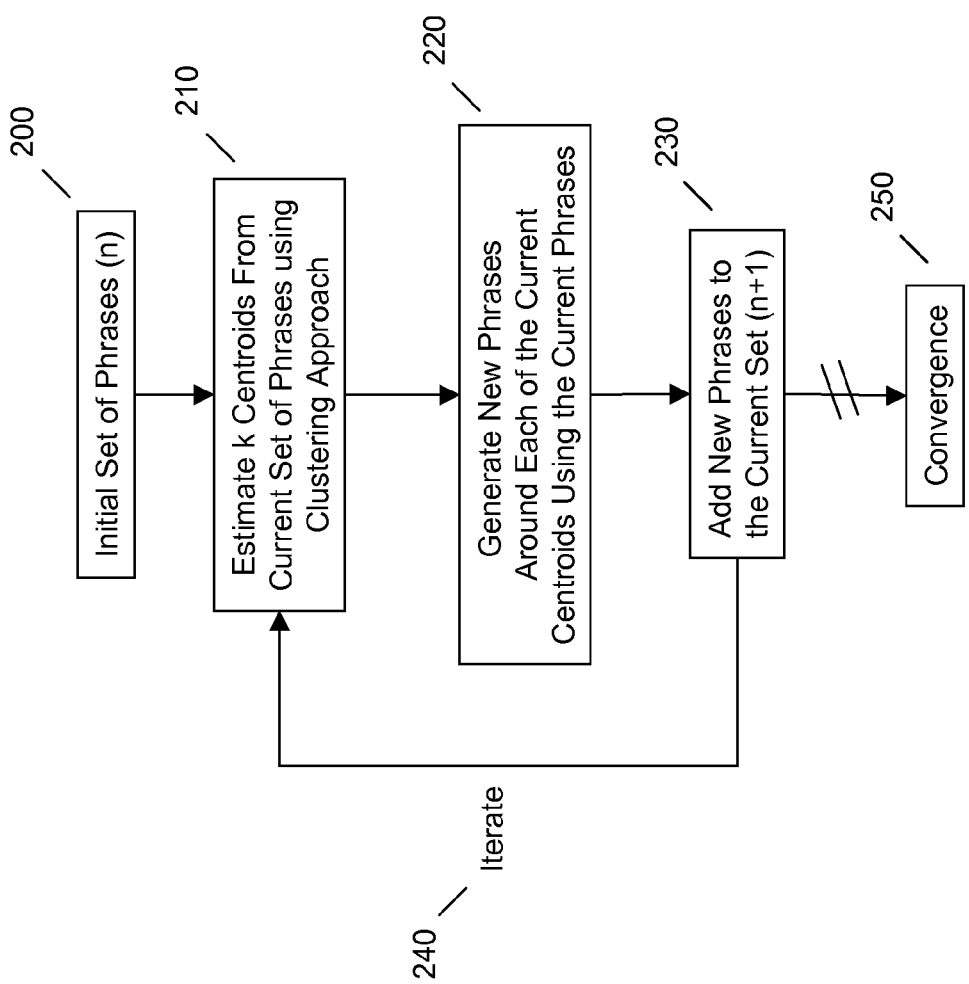
FIG. 2 illustrates an example method for phrase based clustering.

Referring to FIG. 2, as described herein, k means is used as an example clustering approach; however, this is by no means limiting. For k means clustering, the process starts with an initial set of phrases (n) 200 from a document collection containing at least all unigrams. Clustering the unigrams of the set (n) estimates k centroids 210 from the current set of phrases using k-means clustering approach. Next, a new set of phrases is generated 220. These new phrases occur "around" each of the current centroids (that is, as selected using the current phrases, that is, unigrams). These new phrases are added 230 to the current set to form a new set (n+1, that is, bigrams). The process is iterated 240 to cluster using the new set (n+1) as input until for example until convergence 250.

As described herein, to find phrases "around" each of the current centroids, one cannot (feasibly) create context vectors for all phrases of the document collection and then find those nearest to the centroid because of the numerosity of potential phrases within the collection. This difficulty will be further solidified in description of FIG. 4. Thus, embodiments create candidate phrases by combining existing lower order phrases so that the candidate phrase must: be a valid phrase in the document collection (it actually occurs within the collection); and, must be close (as defined by a suitable similarity threshold) to the centroid in question. Once candidate phrases meeting these criteria have been identified, the candidate phrases can be pruned based on their similarity with the centroid. For this, a monotonicity property and an inverted index can be used. Moreover, lower order phrases combinations can be further pruned using an around index and by pruning out phrases that do not occur "near" to one another within the document collection (similarly, as defined by a suitable distance threshold).

The monotonicity property is a defined herein as follows: a higher order phrase $W_0W_1$, generated by combining two lower order phrases $W_0$ and $W_1$, exists in the document collection if both $W_0$ and $W_1$ appear around the same context word W' in some context window CW. Around indexing (using an around index) is defined herein as mapping from a word w to phrases p such that both p and w appear in some context windows cw in some document d of the collection.

Figure 3:
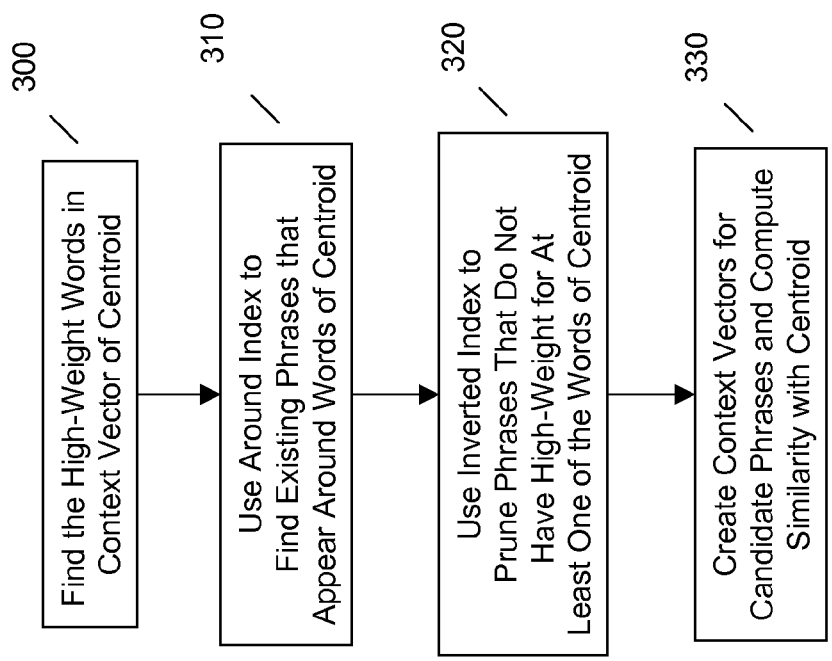
FIG. 3 illustrates an example method for generating new phrases for phrase based clustering.

As an example technique for finding new phrases occurring "around" each of the current centroids, embodiments apply a guided phrase based clustering approach. FIG. 3 illustrates an example method for finding the new phrases (corresponding to step 220 of FIG. 2). The goal here is to find higher order phrases (that is, a bigram, trigram, 4-gram, et cetera, consisting of more than a unigram) that have at least one shared high value word with the centroid's vector. Thus, the process begins by finding the high weight words 300 in the context vector of a centroid. A high weight word is determined for example by a vector of weights or importance. A centroid vector directly contains information of high weight words. Using an around index, existing phrases that appear around these words are identified 310. Using an inverted index, these phrases are pruned 320 in order to remove those phrases that do not have high weight words for at least one of the words (in the context vector of a centroid). Next, context vectors are created 330 for candidate phrases and their similarity with the centroid is computed. The resulting candidate phrases are used for iteration (step 240 of FIG. 2).

Figure 4:
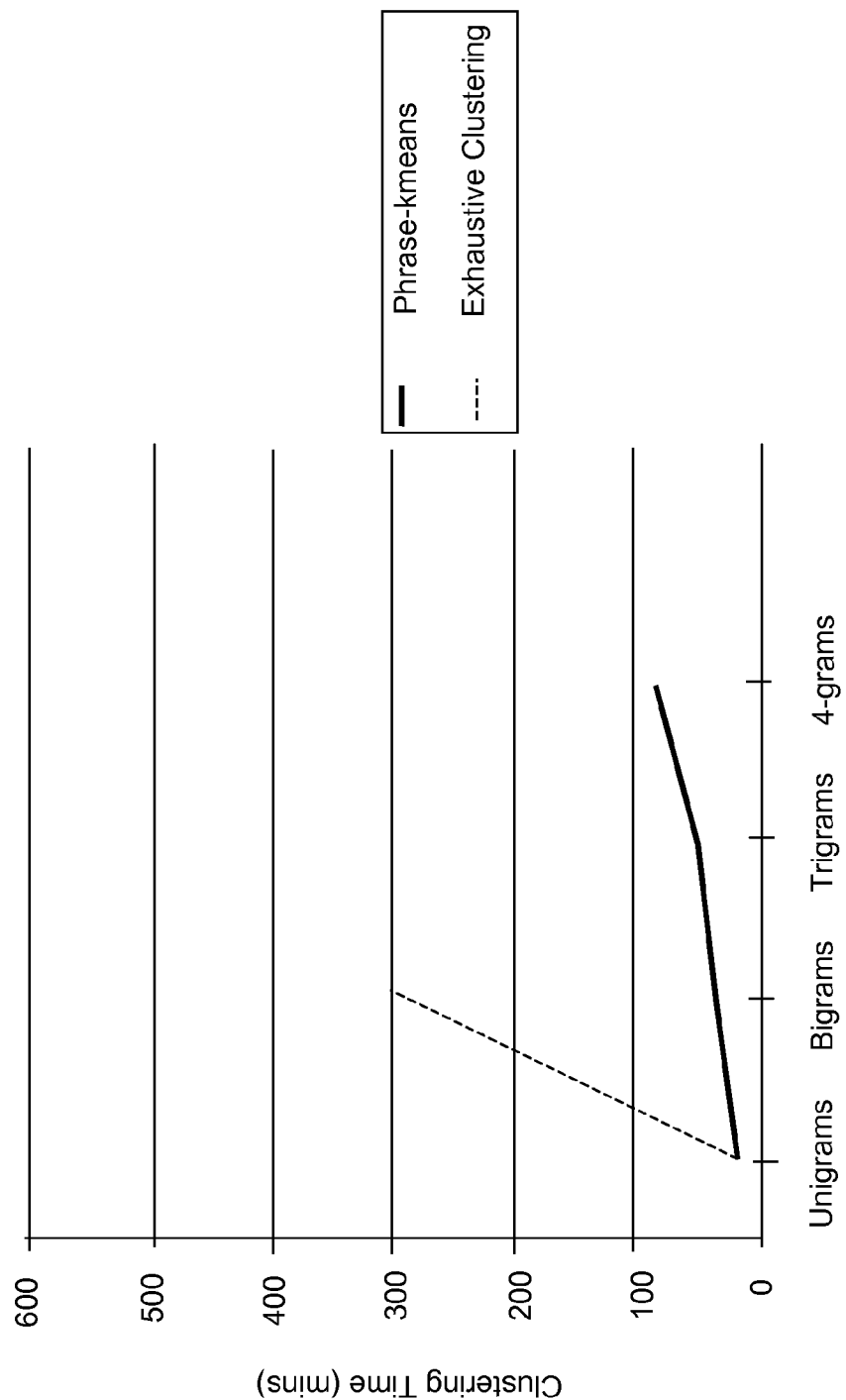
FIG. 4 illustrates an example of improved clustering time using phrase based clustering.

By narrowing down the pool of potential phrases, embodiments speed up phrase based clustering dramatically, making it a feasible process. FIG. 4 illustrates an example implementation of phrase based clustering according to embodiments as compared with naïve phrase based clustering. The clustered items used for this example included a subset of the Reuters DataSet. The collection of documents included 108,522 words and 1075 documents. Of the 108,522 words, approximately 12,800 words were identified as unique (non-unique words such as "a", "the", "to", et cetera being removed). The 12,800 words resulted in 276,426 unique bigrams, which indicates the massive amount of potential phrases in the document collection. Table 1 includes some of the clusters identified.

| Cluster 1 | Cluster 2 |
| --- | --- |
| Two Companies | Executive |
| Browsers | Vice Chairman |
| Launched | Market Share |
| Develop Version | Financial Report |
| Plan New Business | Percent Market |
| ... | ... |

Illustrated in FIG. 4 are the processing times needed for phrase based clustering using naïve (exhaustive) clustering and phrase based clustering (phrase-k means) according to an example embodiment. The machine utilized for this example was an IBM T43P laptop with roughly 2 GHz processor, 2 GB RAM running Windows XP and coded in Java. This configuration should be treated as a non-limiting example only.

As shown, the exhaustive clustering takes an inordinate amount of time for any phrase consisting of more than bigrams (that is, trigrams, 4-grams, et cetera). In fact, the exhaustive clustering did not complete and was shut off after approximately two days time. In stark contrast, the phrase based clustering according to embodiments completed bigrams, trigrams and 4-grams in under 100 minutes.

It should be noted that where items clustered are documents, each document is represented by the words that occur in it. There is a separate task of word clustering where items are words or phrases. Each word or phrase here is represented by the set of words it occurs together with in a context window throughout the document collection. Once these representations are fixed, document clustering or word clustering uses the same clustering process. The example embodiments described above largely focus on the word clustering problem, going from single words to longer and longer phrases (bigrams, tri-grams, et cetera). However there is additionally a simple, fast embodiment for document clustering. If the document clustering is performed as described herein, embodiments take the centroid words of the resultant clusters up to a threshold (because every centroid is a weighted list over all words in vocabulary). These centroid words are treated as the unigrams. Then, embodiments expand unigrams into bi-grams using techniques described above. Then bi-grams into tri-grams et cetera. Thus, no re-clustering (iteration), as described above on phrase clustering, is required. The effect is that embodiments can find longer and longer phrases efficiently to help interpret the clusters, which can be output directly (for example, following step 330 of FIG. 3).

Figure 5:
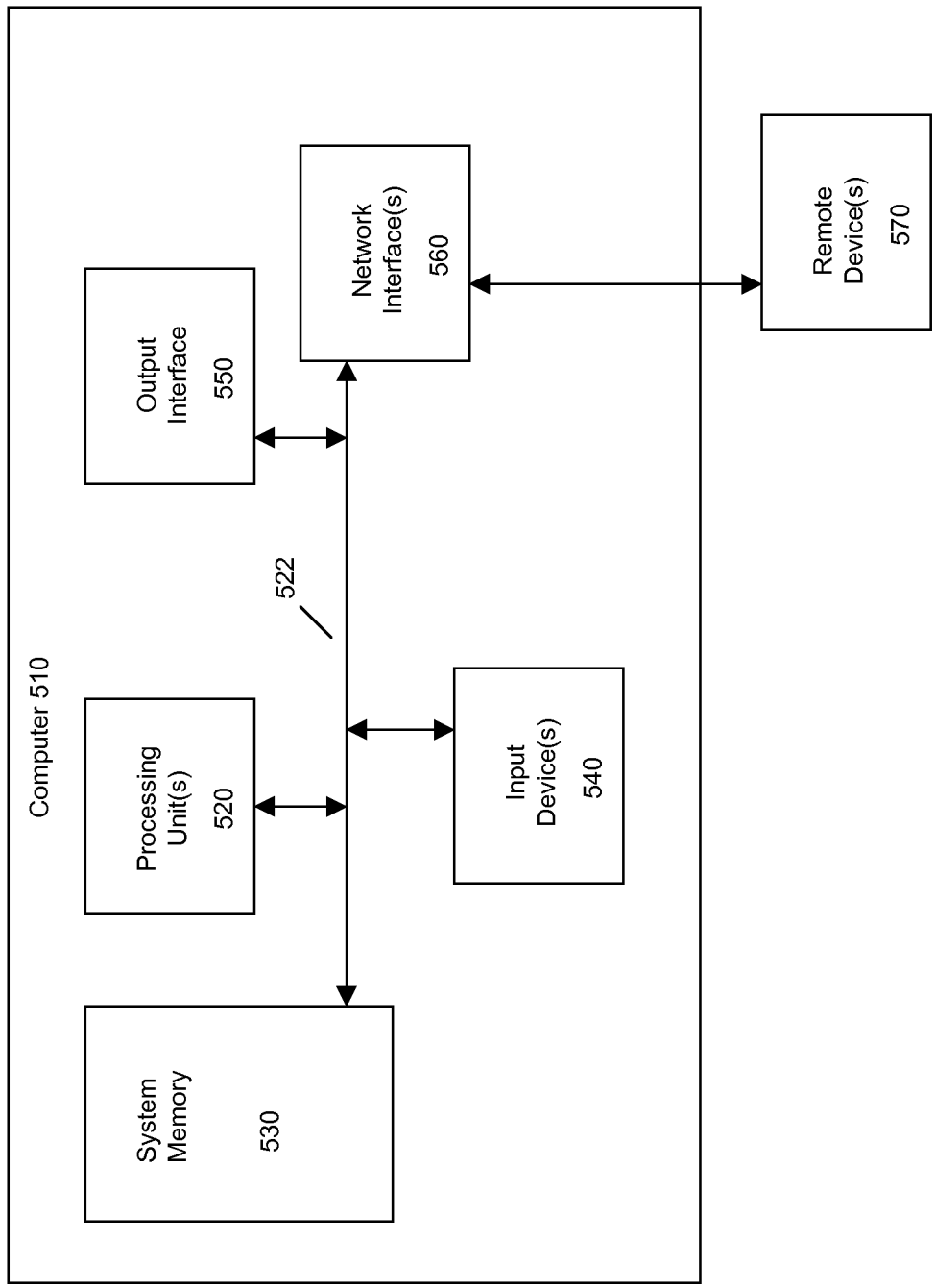
FIG. 5 illustrates an example computer system.

FIG. 5, it will be readily understood that certain embodiments can be implemented using any of a wide variety of devices or combinations of devices. An example device that may be used in implementing one or more embodiments includes a computing device in the form of a computer 510. In this regard, the computer 510 may execute program instructions configured to cluster using an appropriate clustering approach such as k means, produce a set of candidate phrases, prune the candidate phrases, iterate phrase based clustering, and perform other functionality of the embodiments, as described herein.

Components of computer 510 may include, but are not limited to, a processing unit 520, a system memory 530, and a system bus 522 that couples various system components including the system memory 530 to the processing unit 520. The computer 510 may include or have access to a variety of computer readable media. The system memory 530 may include computer readable storage media in the form of volatile and/or nonvolatile memory such as read only memory (ROM) and/or random access memory (RAM). By way of example, and not limitation, system memory 530 may also include an operating system, application programs, other program modules, and program data.

A user can interface with (for example, enter commands and information) the computer 510 through input devices 540. A monitor or other type of device can also be connected to the system bus 522 via an interface, such as an output interface 550. In addition to a monitor, computers may also include other peripheral output devices. The computer 510 may operate in a networked or distributed environment using logical connections to one or more other remote computers or databases. The logical connections may include a network, such local area network (LAN) or a wide area network (WAN), but may also include other networks/buses.

It should be noted as well that certain embodiments may be implemented as a system, method or computer program product. Accordingly, aspects may take the form of an entirely hardware embodiment, an entirely software embodiment (including firmware, resident software, micro-code, et cetera) or an embodiment combining software and hardware aspects that may all generally be referred to herein as a "circuit," "module" or "system." Furthermore, aspects may take the form of a computer program product embodied in one or more computer readable medium(s) having computer readable program code embodied therewith.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, et cetera, or any suitable combination of the foregoing.

Computer program code for carrying out operations for various aspects may be written in any combination of one or more programming languages, including an object oriented programming language such as Java™, Smalltalk, C++ or the like and conventional procedural programming languages, such as the "C" programming language or similar programming languages. The program code may execute entirely on a single computer (device), partly on a single computer, as a stand-alone software package, partly on single computer and partly on a remote computer or entirely on a remote computer or server. In the latter scenario, the remote computer may be connected to another computer through any type of network, including a local area network (LAN) or a wide area network (WAN), or the connection may be made for example through the Internet using an Internet Service Provider.

Aspects are described herein with reference to flowchart illustrations and/or block diagrams of methods, apparatuses (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Although illustrated example embodiments have been described herein with reference to the accompanying drawings, it is to be understood that embodiments are not limited to those precise example embodiments, and that various other changes and modifications may be affected therein by one skilled in the art without departing from the scope or spirit of the disclosure.

What is claimed is:

1. A computer program product for phrase based clustering comprising:
    a computer readable storage medium having computer readable program code embodied therewith, the computer readable program code comprising:
    computer readable program code configured to access a collection of items to be clustered;
    computer readable program code configured to receive an initial set of phrases as input;
    computer readable program code configured to cluster the collection of items to be clustered using the initial set of phrases to create centroids;
    computer readable program code configured to generate a new set of phrases around the centroids;
    computer readable program code configured to add the new set of phrases to the initial set of phrases to produce a combined set of phrases; and
    computer readable program code configured to re-cluster the collection of items to be clustered using the combined set of phrases;
    wherein to generate a new set of phrases around the centroids comprises:
    finding high weight words in a context vector for a centroid;
    finding existing phrases that appear around words of a centroid; and
    pruning phrases that do not have high weight for at least one of the words of the centroid;
    said pruning comprising:
        generating a higher-order phrase via combining two lower-order phrases, each of the higher-order phrase and the two lower-order phrases comprising a context vector; and
        employing a monotonicity property, wherein the higher-order phrase has high weight for a word in its context vector if both of the lower order phrases individually each have high weight for the at least one word in their context vectors.

2. The computer program product according to claim 1, wherein to generate a new set of phrases around the centroids comprises:
    using an around index for said finding of existing phrases that appear around words of a centroid;
    using an inverted index for said pruning of phrases that do not have high weight for at least one of the words of the centroid;
    creating context vectors for candidate phrases; and
    computing similarity of one or more of the candidate phrases with respect to one or more of the centroids.

3. The computer program product according to claim 1, wherein the items to be clustered comprise a collection of documents.

4. The computer program product according to claim 3, wherein the initial set of phrases comprise unigrams.

5. The computer program product according to claim 4, wherein the unigrams each comprise a word.

6. The computer program product according to claim 5, wherein the combined set of phrases comprise one or more of bigrams, tri-grams and higher-order grams.

7. The computer program product according to claim 1, wherein re-clustering the collection of items to be clustered using the combined set of phrases comprises re-clustering until convergence.

8. The computer program product according to claim 7, further comprising computer readable program code configured to output a final set of clusters responsive to convergence.

9. The computer program product according to claim 7, wherein to output a final set of clusters responsive to convergence further comprises organizing and storing documents of the collection of documents into the final set of clusters.

10. A system for phrase based clustering comprising:
one or more processors; and
a memory operatively connected to the one or more processors;
wherein, responsive to execution of computer readable program code accessible to the one or more processors, the one or more processors are configured to:
access a collection of items to be clustered;
receive an initial set of phrases as input;
cluster the collection of items to be clustered using the initial set of phrases to create centroids;
generate a new set of phrases around the centroids;
add the new set of phrases to the initial set of phrases to produce a combined set of phrases; and
re-cluster the collection of items to be clustered using the combined set of phrases;
wherein to generate a new set of phrases around the centroids comprises:
finding high weight words in a context vector for a centroid;
finding existing phrases that appear around words of a centroid; and
pruning phrases that do not have high weight for at least one of the words of the centroid;
said pruning comprising:
generating a higher-order phrase via combining two lower-order phrases, each of the higher-order phrase and the two lower-order phrases comprising a context vector; and
employing a monotonicity property, wherein the higher-order phrase has high weight for a word in its context vector if both of the lower order phrases individually each have high weight for the at least one word in their context vectors.

* * * * *